United States Patent
Stuart et al.

(10) Patent No.: US 7,480,730 B2
(45) Date of Patent: Jan. 20, 2009

(54) CREDIT RECOVERY IN A CREDIT BASED FLOW CONTROL SYSTEM

(75) Inventors: David Stuart, Almonte (CA); Markus Wandel, Kanata (CA); Blake Toplis, Ottawa (CA)

(73) Assignee: Nortel Networks Limited, St. Laurent, Quebec ( * ) Notice: Subject to any disclaimer, the term of this patent is extended or adjusted under 35 U.S.C. 154(b) by 1008 days.

(21) Appl. No.: 10/821,090

(22) Filed: Apr. 8, 2004

(65) Prior Publication Data

US 2005/0228900 A1    Oct. 13, 2005

(51) Int. Cl.
 *G06F 15/16* (2006.01)
 *H04L 5/22* (2006.01)
 *G06F 15/173* (2006.01)
(52) U.S. Cl. .............. 709/232; 370/399; 370/235; 705/38; 713/172
(58) Field of Classification Search ......... 709/228–235; 370/235, 236, 399; 713/172; 705/38
See application file for complete search history.

(56) References Cited

U.S. PATENT DOCUMENTS

| 5,633,867 | A | * | 5/1997 | Ben-Nun et al. | 370/399 |
| 5,825,748 | A | * | 10/1998 | Barkey et al. | 370/236 |
| 6,044,406 | A | | 3/2000 | Barkey et al. | |
| 2003/0145205 | A1 | * | 7/2003 | Sarcanin | 713/172 |
| 2004/0027989 | A1 | * | 2/2004 | Martin et al. | 370/229 |
| 2004/0236675 | A1 | * | 11/2004 | Lynch et al. | 705/38 |
| 2006/0050639 | A1 | * | 3/2006 | Stuart et al. | 370/235 |

* cited by examiner

*Primary Examiner*—Haresh N Patel (57) ABSTRACT

An apparatus and a method for sender-initiated credit recovery in a closed-loop credit based flow control system, includes assigning a number of credits to a sender unit in the credit based flow control system. The method also includes decrementing a credit count in the sender unit in response to the sender sending data to the receiver and incrementing the credit count in the sender unit in response to receiving returned credits from the receiver unit. The method also includes determining if a loss or gain in the number of credits in the credit based flow control system has occurred and adjusting the credit count based on the determined loss or gain.

21 Claims, 7 Drawing Sheets

CREDIT RECOVERY IN A CREDIT BASED FLOW CONTROL SYSTEM

BACKGROUND

Data communication networks can use flow control to regulate the flow of data and reduce congestion within a network. Flow control is used between nodes in a network by sending messages across a transmission medium indicating when a data packet is ready to be received. Flow control is also used between devices in a network by providing signals to indicate the status of device. Flow control between network devices typically includes monitoring the state of a data buffer or queue to prevent overflow or underflow of the data buffer or queue.

SUMMARY

In one aspect, a method for sender-initiated credit recovery in a closed-loop credit based flow control system, includes assigning a number of credits to a sender in the credit based flow control system. The method also includes decrementing a credit count in the sender in response to the sender sending data to the receiver and incrementing the credit count in the sender in response to receiving returned credits from the receiver. The method also includes determining if a loss or gain in the number of credits in the credit based flow control system has occurred and adjusting the credit count based on the determined loss or gain.

Embodiments may include one or more of the following. Each credit can indicate an amount of data that the sender can send to a receiver. Initializing the counter can include initializing the counter upon sending the credit check message from the sender to the receiver. Adjusting the credit count based on the determined loss or gain can include performing a signed addition of the number of outstanding credits in the counter and the credit count.

Determining if a loss or gain in the number of credits in the credit based flow control system has occurred can include sending a credit check message from the sender to the receiver and initializing a counter with a number of outstanding credits. Determining if a loss or gain has occurred can also include decrementing the counter based on a number of credits returned from the receiver and receiving, at the sender, a credit check return message from the receiver that indicates that the value of the outstanding credits counter is the loss or gain.

Sending the credit check message can include sending the credit check message in-band with data. Initializing the counter can include using the value of the credit count and the value of max credits determined by the position of the credit check message in a data stream. Decrementing the counter can include decrementing the counter by credits returned to the sender from the receiver between sending the credit check message and receiving the credit check return message.

The method can also include decrementing the counter by a number of credits returned in the credit check return message and incrementing the credit count by the number of credits returned in the credit check return message. The method can include decrementing the counter by a number of credits returned in the credit check return message and not incrementing the credit count by a count of unreturned credits in the receiver.

The credit check return message can carry a count of unreturned credits and does not include credits. The sending order of credit check return messages and credit return messages from the receiver can be maintained to the sender. The sender can be a credit head end and the receiver can be a credit queue end.

In another aspect of the invention, a method for determining if an error in the number of credits in the credit based flow control system has occurred includes receiving a credit check message from a sender at a receiver and sending a credit check return message from the receiver that indicates that the value of the outstanding credits counter is the error.

Embodiments can include one or more of the following. The method can also include enqueuing data to a credit managed data queue upon arrival at the receiver and returning credits to the sender based on an amount of data dequeued from the credit managed queue. The method can also include enqueuing the credit check message to a credit managed queue in order of reception with the data and returning the credit check return message upon dequeue of the credit check message. The method can also include returning unreturned credits for dequeued data before sending the credit check return message. Sending a credit check return message can include sending a credit check return message upon receiving the credit check message. The credit check return message can carry any previously unreturned credits for dequeued data from the receiver to the sender. The credit check return message can carry the number of credits in the receiver, including the credit value of data in the queue and any previously unreturned credits for dequeued data.

In other aspects of the invention, a closed-loop credit based flow control system includes a sender. The sender is configured to assign a number of credits in the credit based flow control system and decrement a credit count in response to the sender sending data to a receiver. The sender is also configured to increment the credit count in response to receiving returned credits from the receiver, determine if a loss or gain in the number of credits in the credit based flow control system has occurred, and adjust the credit count based on the determined loss or gain.

Embodiments can include one or more of the following. Each credit can indicate an amount of data that the sender can send to the receiver.

The system can be further configured to send a credit check message from the sender to the receiver, initialize a counter with a number of outstanding credits, decrement the counter based on a number of credits returned from the receiver, and receive, at the sender, a credit check return message from the receiver that indicates that the value of the outstanding credits counter is the loss or gain. The system can be further configured to initialize a counter upon sending the credit check message from the sender to the receiver.

The system can also include a receiver. The receiver can be configured to receive a credit check message from the sender and send a credit check return message that indicates that a number of outstanding credits. The receiver can also be configured to enqueue data to a credit managed data queue upon arrival at the receiver and return credits to the sender based on an amount of data dequeued from the credit managed queue. The receiver can be further configured to enqueue the credit check message to a credit managed queue in order of reception with the data and return the credit check return message upon dequeue of the credit check message.

In another aspect of the invention, a system includes a network processor including a sender and a receiver. The sender is configured to assign a number of credits in the credit based flow control system. The sender is also configured to decrement a credit count in response to the sender sending data to a receiver and increment the credit count in response to receiving returned credits from the receiver. The sender is also configured to determine if a loss or gain in the number of credits in the credit based flow control system has occurred and adjust the credit count based on the determined loss or gain.

Embodiments can include one or more of the following. The receiver can be configured to receive a credit check message from the sender and send a credit check return message that indicates that a number of outstanding credits.

In another aspect of the invention, a computer program product is tangibly embodied in an information carrier, for executing instructions on a processor. The computer program product is operable to cause a machine to assign a number of credits in the credit based flow control system and decrement a credit count in response to the sender sending data to a receiver. The computer program product is further operable to increment the credit count in response to receiving returned credits from the receiver and determine if a loss or gain in the number of credits in the credit based flow control system has occurred. The computer program product is further operable to adjust the credit count based on the determined loss or gain.

Embodiments can include one or more of the following. The computer program product can be configured to receive a credit check message from the sender and send a credit check return message that indicates that a number of outstanding credits.

Among other advantages, the credit check can correct errors in the number of total credits in a closed loop credit based control system. In some examples, the pipe-clean message is processed by the credit queue end upon receipt of the message. This arrangement provides the advantage of reduced response time for credit recovery, independent of queue drain rate.

DESCRIPTION

Figure 1:
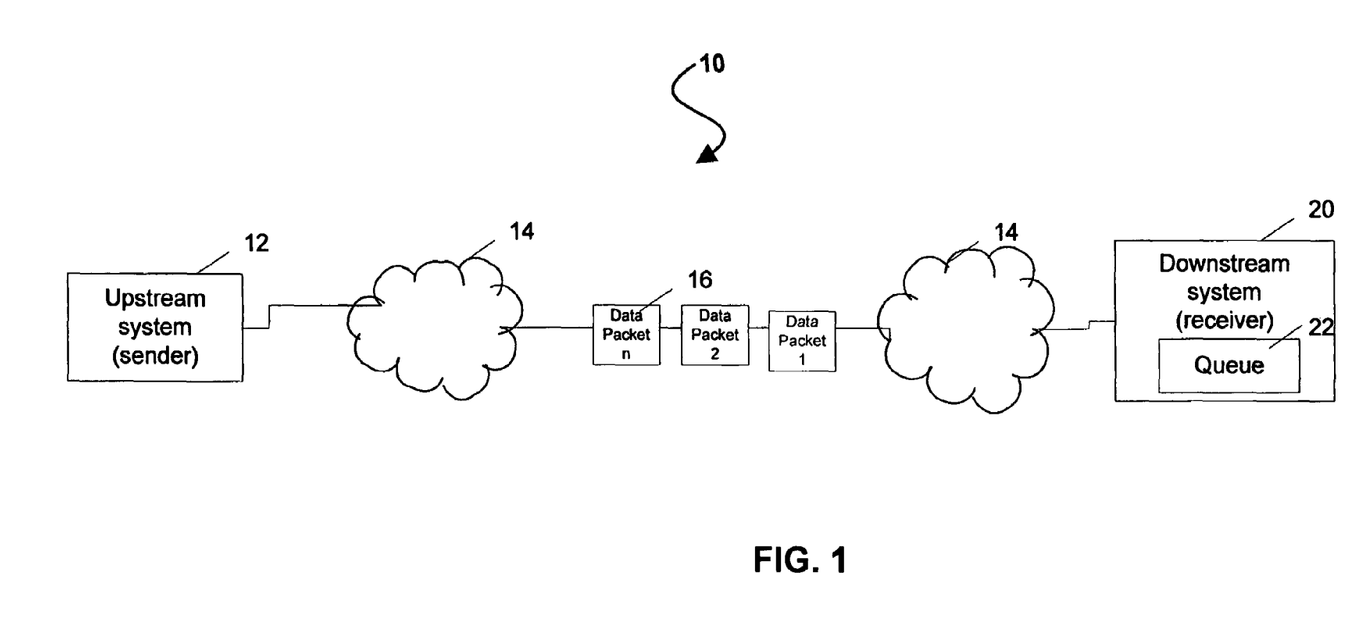
FIG. 1 is a block diagram of a system.

Referring to FIG. 1, a system 10 for transmitting data over a network 14 is shown. The system includes a node or system 12 that sends packets or other data 16 to another node or system 20 across a network portion 14. System 20 includes a queue 22, and packets are placed in the queue 22 when received from system 12. If system 12 sends data at the same rate as queue 22 processes and removes the data, the queue 22 may not become too full or too empty.

System 12 and system 20 may operate at different rates. For example, the system 12 may send data at a higher transfer rate than the system 20 and queue 22 is capable of processing and forwarding. The rate differences can result in an excess amount of data at system 20 that accumulates in the queue 22. As excess data accumulates in queue 22, queue 22 may overflow, e.g., packets being dropped and data lost, if system 12 continues to send data at the same rate.

In order to prevent an overflow condition, the queue 22 is monitored and a signal is sent to the sender system 12 to indicate a fill level (e.g., if the queue is full or empty) or to indicate an overflow condition. Upon receiving this feedback, system 12 modifies the rate that data is sent to system 20. For example, system 12 reduces the rate or sets the rate to zero when queue 22 is full or the network is congested.

Figure 2:
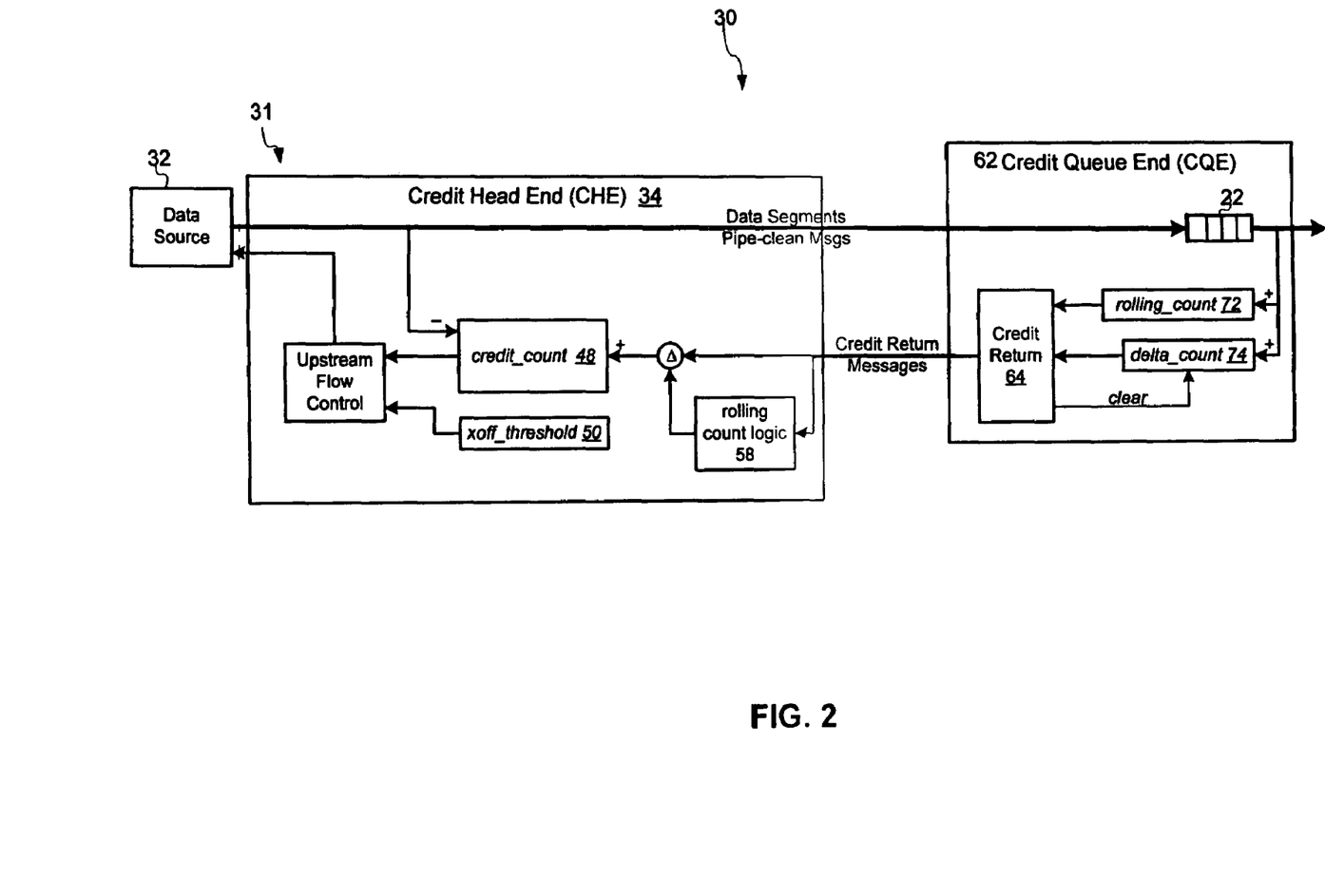
FIG. 2 is a block diagram of a credit based flow control system.

Referring to FIG. 2, a system 30 for monitoring and managing a fill level of a queue 22 that receives packets or frames from a data source 32 (e.g., included in system 12, FIG. 1) is shown. The system 30 includes a closed loop credit based flow control arrangement 31 to manage the amount of data sent to queue 22 based on the amount of data present in the queue 22 (as indicated by the number of credits).

In the system 30, 'credits' represents the ability of the queue 22 to receive data. Each credit represents a permission to send one unit of data to the queue 22. A unit can be a single byte of data, a predetermined number of bytes of data, or another unit such as a frame or packet. The number of credits in the closed loop credit based flow control arrangement 31 is set based on the length of the queue 22 or based on the perceived data rates of the system 30.

The closed loop credit based flow control arrangement 31 includes a credit head end (CHE) 34 and a credit queue end (CQE) 62. The credit head end 34 tracks the number of credits and sends a signal 38 to the data source 32 to modify the transmission rate based on the number of credits. At the time the link is established, a number of credits are assigned to the credit head end 34. This number of credits (also referred to as initial credit count) is stored in the credit count 48 and in max credits 52. The number of credits can be set manually, by the system or can be predefined. When the scheduler 32 sends a unit of data to the queue 22, the credit head end decrements the number of available credits in the credit count 48. At the credit queue end 62, when a unit (or a set of units) is removed from queue 22, the credit queue end 62 sends a credit return message (CRM) to the credit head end 34. Subsequent to the receipt of the credit return message the credit head end increments the credit count 48 by the number of returned credits.

More specifically, a data source 32 sends data to the queue 22. When a unit of data is sent to queue 22, the credit count 48 is decremented. The data is subsequently received by the credit queue end 62 and placed in the queue 22. Subsequent to the removal of data from queue 22, a rolling count 72 and a delta count 74 are incremented. The credit queue end includes an indication of an update threshold. When the delta count is greater than or equal to the update threshold, a credit return message is generated by the credit return 64 and sent to the credit head end 34 (as indicated by arrow 60). The credit return message includes the rolling count 72. When the credit return message is sent, the delta count is re-set (e.g., set to zero). While a rolling count is included in this example, the rolling count is a robustness feature that makes the system less sensitive to credit return message loss and is not necessary for the credit recovery process. In another example, a rolling count feature is not present and the system simply sends an absolute number of returned credits in the credit return message.

The credit head end 34 receives the credit return messages from the credit queue end 62. Upon receiving a credit return message, the credit head end 34 increments the credit count 48 by the number of credits indicated in the credit return message. The credit head end 34 also includes a rolling count logic 58. The rolling count is used to determine the number of returned credits by subtracting (e.g. using modulo arithmetic) the previous rolling count from the current rolling count. Subsequent to the subtraction, the current rolling count becomes previous rolling count.

As described above, the credit count 48 is incremented by the return of credits from the credit queue end 62 and decremented by the sending of data units. The credit count 48 provides an indication to a scheduler or system about the congestion (or lack of congestion) of queue 22. A threshold value 50 sets a minimum number or credits needed in the credit count for the scheduler 32 to send data to the queue 22. When the credit count 48 is greater than the threshold value 50, a flow control 40 indicates to an upstream data source 32 to send data to queue 22. However, when the credit count 48 is less than the threshold value 50, the upstream flow control 40 indicates to the data source 32 to decrease the data transmission rate or to temporarily cease transmission of data to queue 22. Multiple threshold values may also be used to indicate various levels of rate control.

There are multiple ways in which a credit can be "lost" in the system 30. For example, loss of a credit can occur when a packet sent from the data source 32 to the queue 22 is dropped or corrupted. The loss of a credit occurs in this situation because upon sending the data the credit count 48 is decremented, but the packet is not removed from queue 22 to increase the rolling count 72 (and in turn increase the credit count 48). Another situation that results in the loss of credits is the dropping or corruption of a credit return message from credit return 64 to the credit head end 34. In this situation, while the rolling count 72 is appropriately incremented, the packet is not received by the credit head end and the credit count is not incremented. This results in the loss of credits because the credit count is not increased to offset the decrease in credit count resulting from the data being sent. The rolling count helps to mitigate against errors due to lost credit return messages.

There are multiple ways in which a credit can be "gained" in the system. For example, multiple credit queue ends may be de-multiplexed out of a single transmission media according to an address. If an error in the packet transmission is not detected and the data is placed in the wrong queue on the credit queue end credits can be returned to the wrong credit head end. Credits could also be gained through the corruption of a message from the credit return 64 to the credit head end 34.

Figure 3:
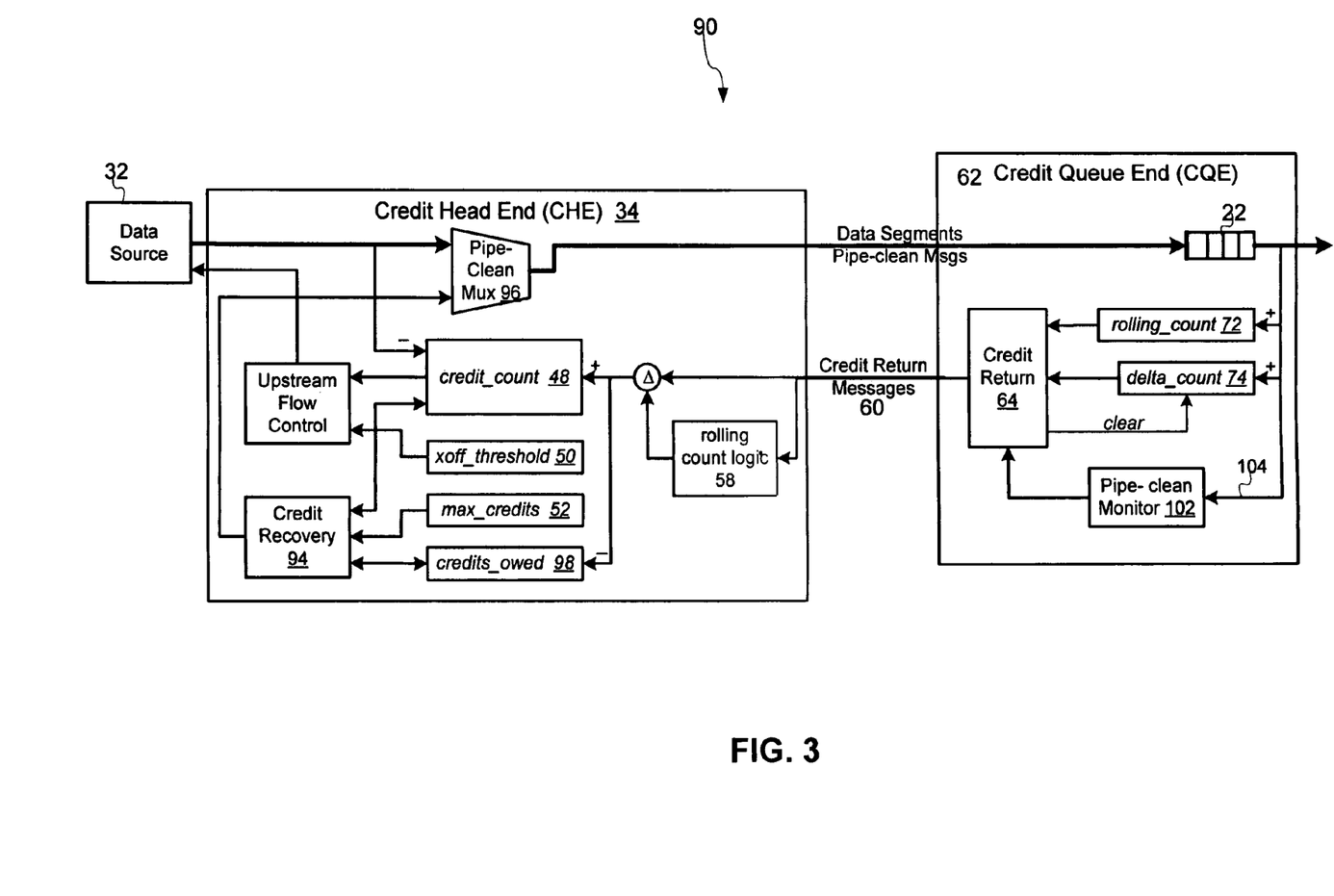
FIG. 3 is a block diagram of a credit based flow control system that includes credit recovery.

Referring to FIG. 3, a system 90 for managing a fill level of a queue 22 includes credit recovery functionality. As described above, conditions may exist in which credits are lost or gained in the closed loop credit based flow control system. A credit recovery operation can correct the loss or gain of credits in the system. The credit recovery operation is initiated by a timer or by other methods such as a predetermined level of credits or a number of units transmitted, or by user (operator) request.

To provide credit recovery, the credit head end 34 includes a credit recovery unit 94. The credit recovery unit 94 generates a message (referred to as a pipe clean message) indicating that a credit recovery operation is to occur. The pipe clean message is multiplexed into the data path by a multiplexer 96 and sent to the queue 22. The message is inserted into the datapath subsequent to the adjustment of the credit count 48. By inserting the pipe clean message into the data stream at a location after the credit count adjustment, the presence of the pipe clean message does not affect the credit count 48 or the total number of credits in the system. Alternately, the credit count can be adjusted for the pipe clean message, in cases where the pipe clean message goes through the queue either logically or physically.

When the pipe clean message is inserted into the data path, the number of credits owed 98 is set to the number of credits outstanding (e.g., the total number of credits minus the credit count). The credits owed 98 is decremented by the credits returned in the credit return messages. After processing the data in the queue 22 prior to the pipe clean message, the pipe clean message is dequeued. In response to the pipe clean message, the credit return 64 generates and sends a credit return message with a pipe clean flag set (a credit return message with a pipe clean flag set is also referred to as a pipe clean response message) to the credit head end 34. The pipe clean return message includes the rolling count 72 at the time the pipe clean message was dequeued. The pipe clean flag indicates to the credit head end that the credit return message is from the pipe clean process. The credit head end increments the credit count and decrements the credits owed by the number of credits indicated in the credit return message with the pipe clean flag set (e.g., the pipe clean response).

In the example above, a credit return message is used as a pipe-clean response message by the setting of a flag in the credit return message. Logically, the pipe-clean response is separate from the credit return message and indicates to the credit head end the termination of the pipe-clean loop (i.e., the credits owed count is ready to be used to adjust the credit count).

In general, there are two methods of handling the pipe clean message at the credit queue end. As described in the previous example, the pipe clean message can physically flow through the queue, and the pipe clean response is generated upon dequeue. Alternatively, the pipe clean request can logically flow through the queue (e.g., logically traverse the queue). The pipe clean message can logically flow through the queue by sampling the write pointer when the pipe clean message arrives, and when the read pointer equals the sampled write pointer, send the pipe clean response.

After decrementing the credits owed 98 by the credits indicated in the pipe clean return message, the credits owed equals zero if no credits have been lost or gained. If the credits owed is not equal to zero, credits have either been lost or gained in the credit based flow control system. A positive number of credits owed indicates a loss of credits in the system. A negative number of credits owed 98 indicates a gain of credits in the system. To adjust for the gain or loss of credits, the credit count 48 is adjusted by the credits owed 98 using a signed addition. If the credits owed equals zero then the signed addition will not change the credit count. Alternately, logic may be included in the credit head end 34 to determine if the credit count is zero. If the credit count is zero, no adjustment of the credit count or further processing related to the credit recovery operation occurs.

Figure 4:
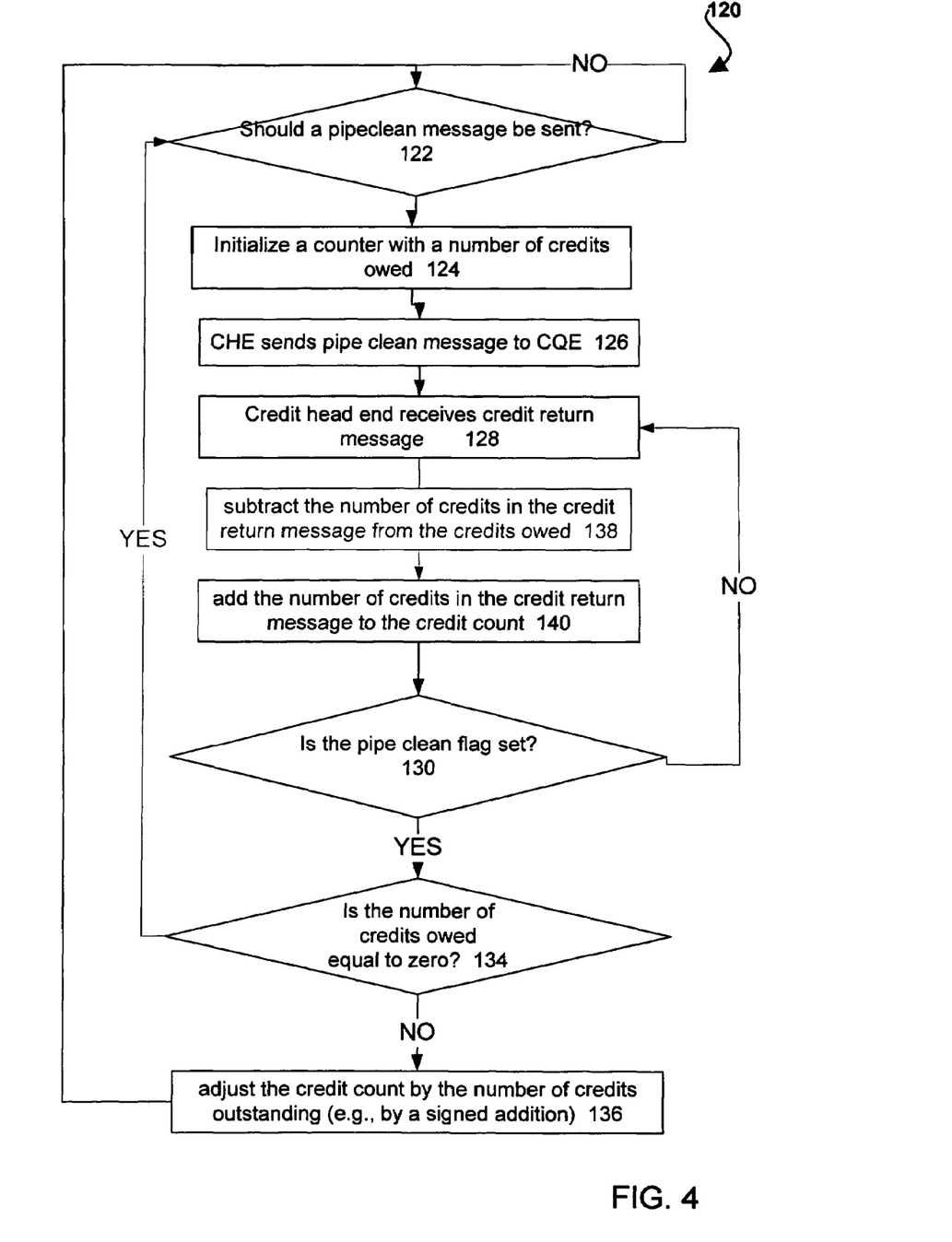
FIG. 4 is a flow chart.

Referring to FIG. 4, a process 120 for credit recovery in a closed loop credit based flow control system is shown. Process 120 includes determining 122 if a pipe-clean message should be sent. If a pipe clean message is to be sent, process 120 initializes 124 a counter with a number of credits outstanding. Subsequently, the credit head end sends 126 a pipe clean message to the credit queue end. The credit head end receives 128 from the credit queue end a credit return message and subtracts 138 the number of credits in the credit return message from the credits owed and adds 140 the number of credits in the message to the credit count. The credit head end subsequently determines 130 if the pipe clean flag is set. If the pipe clean flag is not set then process 120 returns to receiving credit return messages 128. If the pipe clean flag is set, then process 120 determines 134 if a credit adjustment is necessary. If the credits owed is zero no action is necessary and process 120 returns to determining 122 if a pipe clean message should be sent. If the number of credits owed is not equal to zero, process 120 adjusts the credit count by the number of credits outstanding 136 using signed addition of the credits owed to the credit count.

Figure 5:
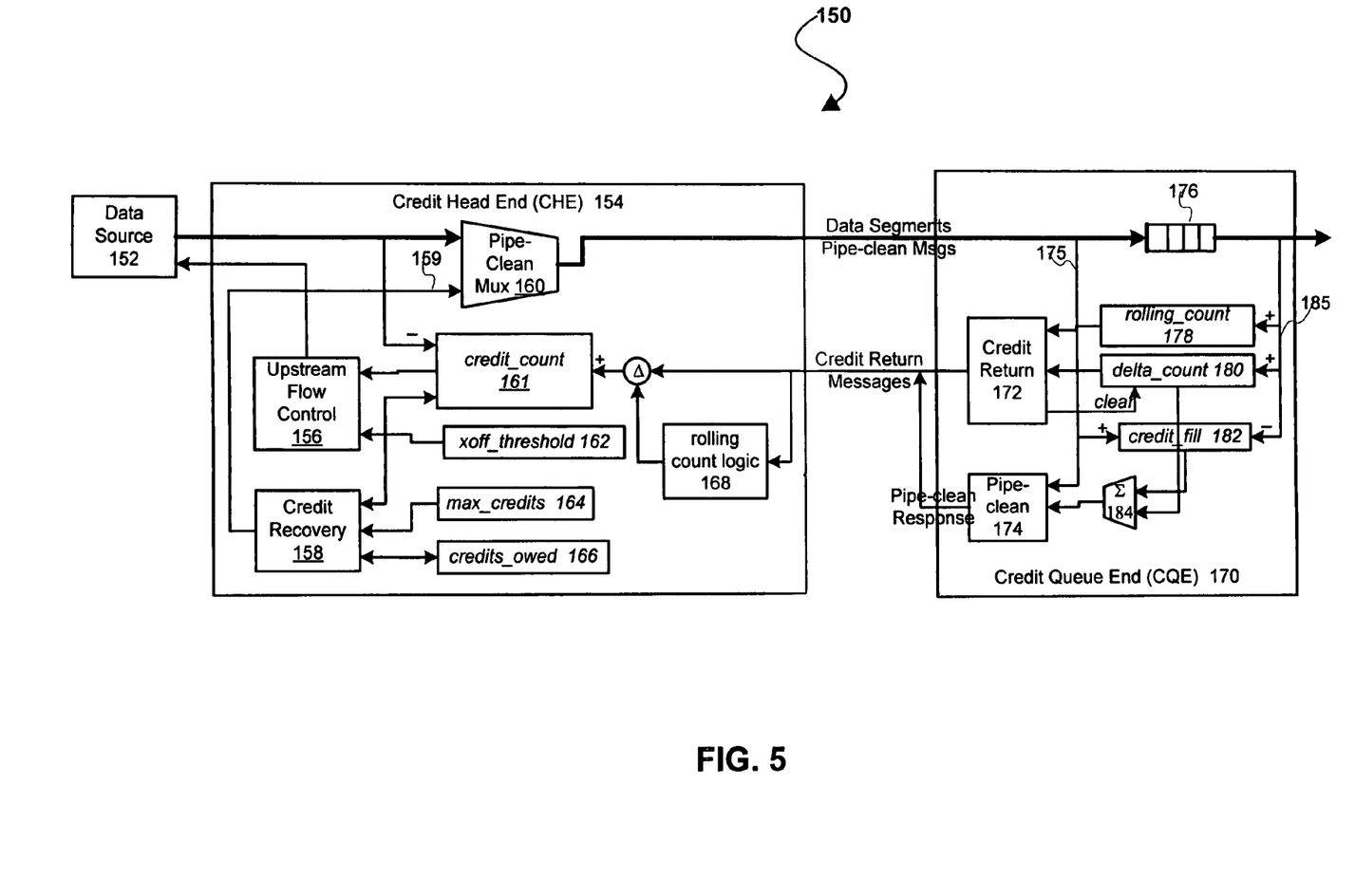
FIG. 5 is a block diagram of a credit based flow control system.

Referring to FIG. 5, another example of closed loop credit based control system 150 with a credit recovery capability is shown. System 150 includes a credit head end 154 and a credit queue end 170. The basic credit operation for controlling the flow of packets from a data source 152 to a queue 176 is described in relation to FIG. 2. In this example, the credit recovery operation for correction of lost or gained credits in the system does not include placing a pipe-clean message in queue 176 (as described in FIG. 3). Alternately, the pipe-clean message is processed by the credit queue end 170 upon receipt of the message. This arrangement provides the advantage of reduced response time for credit recovery, independent of queue drain rate.

In this example, the pipe-clean response is sent by the credit queue end 170 upon receipt of the pipe-clean message. Unlike the flow through scheme discussed above (FIG. 3), the pipe-clean response is not also a credit return message. Instead, the pipe-clean message carries the number of unreturned credits that are at the credit queue end when the pipe-clean message arrives. For example, the number of unreturned credits includes the credits in the queue 176 and the delta count 180.

In particular, the credit recovery operation uses a pipe-clean message to signal to the credit queue end that a credit recovery operation (or pipe-clean) is to be performed. The credit head end 154 inserts a pipe-clean message into the datapath (indicated by arrow 159). Upon insertion of the pipe-clean message into the datapath, the credit head end 154 sets credits owed 166 to be equal to max credits 164 minus the credit count 161. The credits owed should be equal to the credits outstanding (e.g., the credit queue end 170 plus the credits in flight plus the credit returns in flight) if no gain or loss of credits has occurred. The credits owed 166 is decremented by the credits returned in the credit return messages before the pipe-clean response is received.

The credit queue end 170 receives the pipe-clean message and sends a pipe-clean response. The response includes the number of credits at the credit queue end, for example, the sum of the delta count 180 and the credit fill 182. The credit fill 182 is a count of the credits in queue 176. Credit fill 182 increments when data units are inserted into queue 176 and decrements when data units are removed from queue 176 (as indicated by arrows 175 and 185 respectively). The delta count 180 indicates the credits associated with the data already removed from queue 176 but not yet returned to the credit head end. The sum equals the total credits for the credit queue end 170. The sum of the delta count 180 and the credit fill 182 is calculated by a hardware adder 184 or by a software component. The value of the sum is returned to the credit head end 154 in a pipe clean response message sent from a pipe-clean unit 174.

Subsequent to the receipt of the pipe-clean response, the credits owed 166 are decremented by the number of credits carried in the pipe-clean response. After processing, the credits owed 166 equals zero if no errors have occurred in the credit count (i.e., no credits have been lost or gained in the closed loop system). If the credits owed 166 is not equal to zero, credits owed 166 represents the error, e.g. credits lost or gained in the system. The value of credits owed 166 is added to the credit count 161 using a signed addition to correct/offset the error in the system. The credit count is not decremented by the number of credits carried in the pipe clean response.

Figure 6:
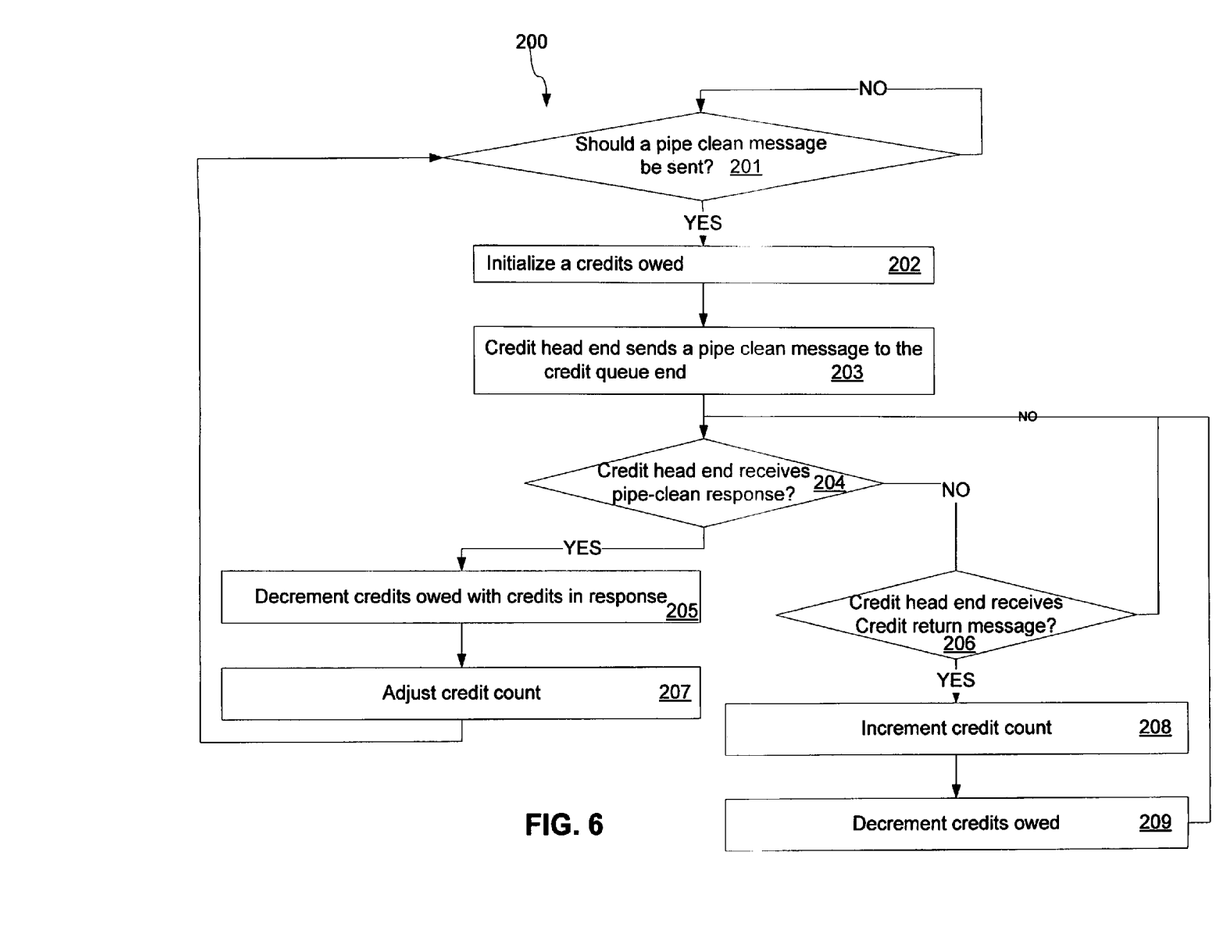
FIG. 6 is a flow chart.

Referring to FIG. 6, a process 200 for a fast credit recovery is shown. Process 200 determines 201 if a pipe-clean message should be sent. If a pipe clean message is to be sent, process 200 initializes 202 a counter with a number of credits outstanding. Subsequently, the credit head end sends 203 a pipe clean message to the credit queue end. The credit head end determines 204 if a pipe clean response is received. If a pipe clean response is not received the credit head end determines 206 if a credit return message had been received. If a message has not been received process 200 returns to determining 204 if a pipe clean response has been received. If the credit head end determined 206 that a credit return message has been received, process 200 increments 208 the credit count and decrements 209 the credits owed. If the credit head end determines 204 that a pipe clean response is received, process 200 decrements 205 the credits owed with the credits in the response and adjusts the credit count 207. Process 200 subsequently returns to determining 201 if a pipe clean message should be sent.

In some examples, the pipe-clean response does not return credits, but the pipe-clean message flows through the queue. For example, the pipe clean response carries zero credits and all credits in the system sent prior to the pipe clean message are returned to the credit head end from the credit queue end prior to the pipe clean response message being returned.

Figure 7:
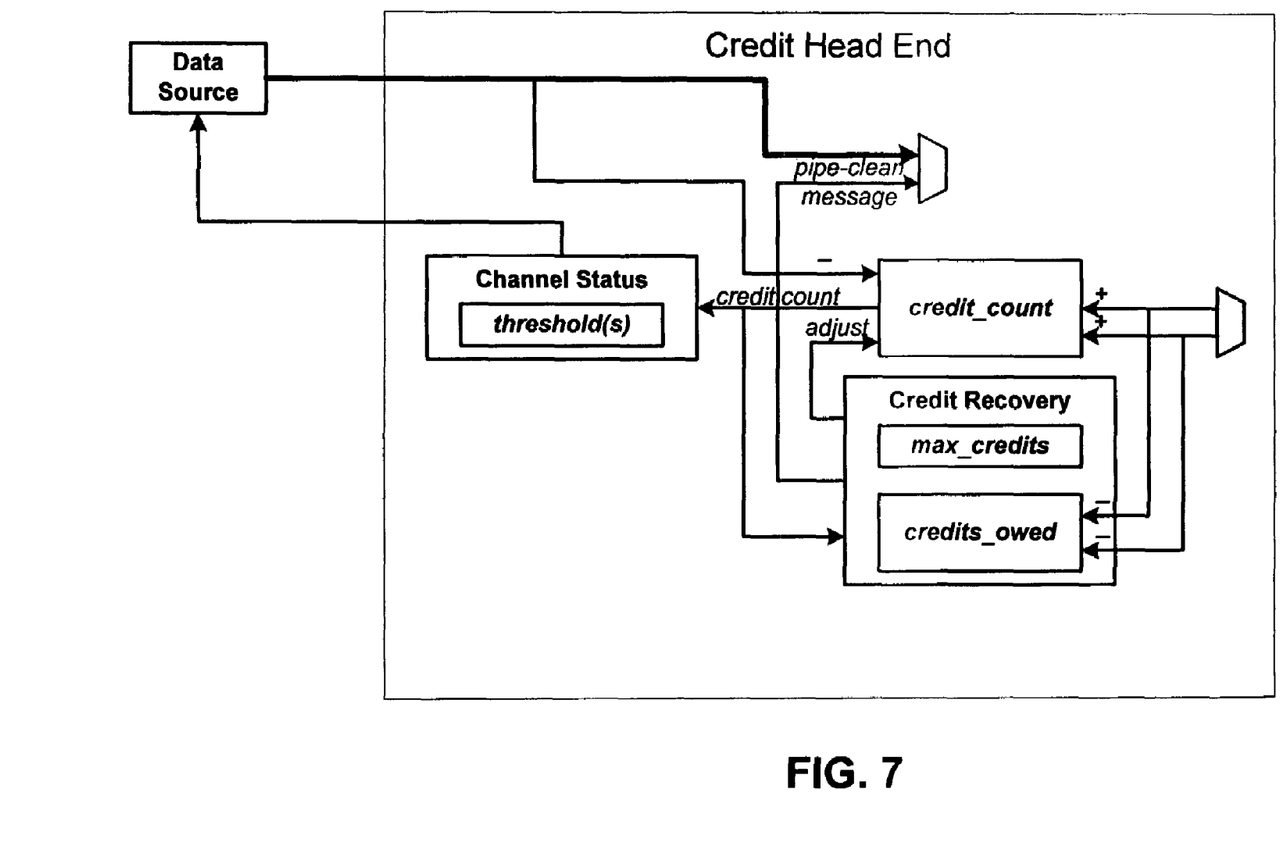
FIG. 7 is a credit head end of a credit based flow control system.

Referring to FIG. 7, another example of a credit head end is shown. In this example, the credit head end includes the data source. The rate at which the data source transmits data is determined by the source rate control based on a set of threshold values. As described above, a credit count is decremented by data sent from the credit head end to the credit queue end and incremented by credits returned in credit return messages. A max credit value limits the credits returned such that the credit count is never greater than the maximum number of credits in the system.

In some examples, a timeout function may be included for a pipe-clean response. For example, The CHE starts a timer when it sends a pipe-clean message. If the pipe-clean response does not arrive before the timer expires, another pipe-clean message is sent for that credit loop.

In another example, the credit system may have multiple credit loops or credit managed queues (simply, channels). The data can be sourced from a common multi-channel data source, and the credit head ends for each channel can be co-located. In one such system, the credit head end is replicated for each channel. In another example, only the credit count, max_credits and channels status are replicated per channel and credit recovery is shared. In the this example, there can be more than one credit recovery block such that high speed channels can be pipe-cleaned more frequently and not have to wait for a pipe-cleaner to flow through a slow, full queue. Credit queue ends may also be co-located and may share credit recovery logic. There may be one or more clusters of credit queue ends of one or more credit queue ends where the data path from, and the credit return path to, the credit head ends may be separate, shared, or a combination of separate and shared between the clusters.

While in the above examples, the credit head end includes a single threshold, multiple thresholds may be included in the credit head end. The use of multiple thresholds can allow the data rate to be incrementally adjusted based on the credits in the system. For example, multiple levels could be set to allow different data transmission rates.

In some examples, the CHE credit counter logic is inverted to count outstanding credits, i.e., increment credit count on sending data, and decrement on credit return. To pipe-clean, take a copy of the credit count, decrement on credit return and pipe-clean response, and adjust credit count using a signed subtract. Similarly, for any counter the system can account for either free space or used space, available credits or outstanding credits, queue fill or queue emptiness.

While in the above examples, the credits owed was determined by subtracting the credit count from the max credits, other formulas could be used. For example, additional variables could be included in the credits owed calculation.

A number of embodiments of the invention have been described. Nevertheless, it will be understood that various modifications may be made without departing from the spirit and scope of the invention. Accordingly, other embodiments are within the scope of the following claims.

What is claimed is:

1. A method for adjusting a credit count in a credit based flow control system, the credit based flow control system having a credit head end and a credit queue end, the method comprising the steps of:
    assigning an initial credit count of credits in the credit head end, each credit representing a permission to send a unit of data from the credit head end to the credit queue end;
    initializing a credit count to be equal to the initial credit count;
    decrementing the credit count for every unit of data sent from the credit head end to the credit queue end;
    sending a credit return message including a returned credit number, the returned credit number indicating a number of units of data removed from a queue at the credit queue end;
    incrementing the credit count in the credit head end by the returned credit number received from the credit queue end;
    sending a credit check message from the credit head end to the credit queue end;
    initializing a credit owed counter with a number of outstanding credits;
    receiving, at the credit head end, the credit return message including the returned credit number;
    decrementing the credit owed counter based on the returned credit number;
    determining a loss or a gain in the credits used in the credit based flow control system using the credit owed counter and the returned credit number; and
    adjusting the credit count based on the loss or the gain.

2. The method according to claim 1, further comprising the steps of:
    providing a rolling count at the credit queue end;
    removing a unit of data from a queue at the credit queue end;
    incrementing the rolling count for the unit of data removed from the queue; and
    calculating the returned credit number using the rolling count.

3. The method according to claim 1, further comprising the steps of:
    providing an update threshhold and a delta count at the credit queue end;
    generating the credit return message when the delta count is greater than the update threshhold; and
    resetting the delta count after sending the credit return message.

4. The method according to claim 1, wherein the number of outstanding credits is the initial credit count minus the credit count.

5. The method of claim 1, wherein the credit check message is multiplexed with data.

6. The method according to claim 1, wherein the initial credit count is set manually, by the system or predefined.

7. The method according to claim 1, further comprising the step of providing a flow control based on the credit count.

8. A credit based flow control system comprising:
    a credit head end and a credit queue end;
    the credit head end comprising:
        a receiver receiving a credit return message including a returned credit number;
        a credit counter initializing a credit count to be equal to a initial credit count of credits, each credit representing a permission to send a unit of data from the credit head end to the credit queue end; the credit counter decrementing the credit count for every unit of data sent from the credit head end to the credit queue end and incrementing the credit count by a returned credit number received from the credit queue end;
        a sender sending a credit check message to the credit queue end;
        a credit owed counter initialized with a number of outstanding credits;
        and decremented by the returned credit number;
    the credit queue end comprising:
        a queue receiving units of data from the credit head end;
        a credit return sender sending the credit return message including the returned credit number, the returned credit number indicating a number of units of data removed from the queue;
    wherein a loss or a gain in the credits used in the credit based flow control system is determined using the credit owed counter and the returned credit number; and the credit count is adjusted based on the loss or the gain.

9. The system as claimed in claim 8 wherein the credit queue end further comprises a rolling count, the rolling count incremented for a unit of data removed from the queue; wherein the returned credit number is calculated using the rolling count.

10. The system as claimed in claim 8, wherein the credit head end further comprises an update threshhold and a delta count, and wherein the credit return message generated when the delta count is greater than the update threshhold;
    and the delta count is reset after the credit return message is sent.

11. The system as claimed in claim 8, wherein the credit head end further comprises a flow control based on the credit count.

12. The system as claimed in claim 8, wherein the number of outstanding credits is the initial credit count minus the credit count.

13. The system as claimed in claim 8, wherein the credit check message is multiplexed with data.

14. The system as claimed in claim 8, wherein the initial credit count is set manually, by the system or predefined.

15. A machine readable storage medium comprising a plurality of instructions for causing a computer to:
    assign an initial credit count of credits in a credit head end, each credit representing a permission to send a unit of data from the credit head end to a credit queue end;
    initialize a credit count to be equal to the initial credit count;
    decrement the credit count for every unit of data sent from the credit head end to the credit queue end;
    send a credit return message including a returned credit number, the returned credit number indicating a number of units of data removed from a queue at the credit queue end;

increment the credit count in the credit head end by the returned credit number received from the credit queue end;

send a credit check message from the credit head end to the credit queue end;

initialize a credit owed counter with a number of outstanding credits;

receive, at the credit head end, the credit return message including the returned credit number;

decrement the credit owed counter based on the returned credit number;

determining a loss or a gain in the credits used in the credit based flow control system using the credit owed counter and the returned credit number; and adjust the credit count based on the loss or the gain.

16. The machine readable storage medium of claim 15 comprising a plurality of instructions for causing a computer to:

provide a rolling count at the credit queue end;

remove a unit of data from a queue at the credit queue end;

increment the rolling count for the unit of data removed from the queue; and calculate the returned credit number using the rolling count.

17. The machine readable storage medium of claim 15 comprising a plurality of instructions for causing a computer to:

provide an update threshhold and a delta count at the credit queue end;

generate the credit return message when the delta count is greater than the update threshhold; and reset the delta count after sending the credit return message.

18. The storage medium according to claim 15, wherein the number of outstanding credits is the initial credit count minus the credit count.

19. The storage medium according to claim 15, wherein the credit check message is multiplexed with data.

20. The storage medium according to claim 15, wherein the initial credit count is set manually, by the system or predefined.

21. The machine readable storage medium of claim 15 comprising a plurality of instructions for causing a computer to provide a flow control based on the credit count.

* * * * *